Figure 1:
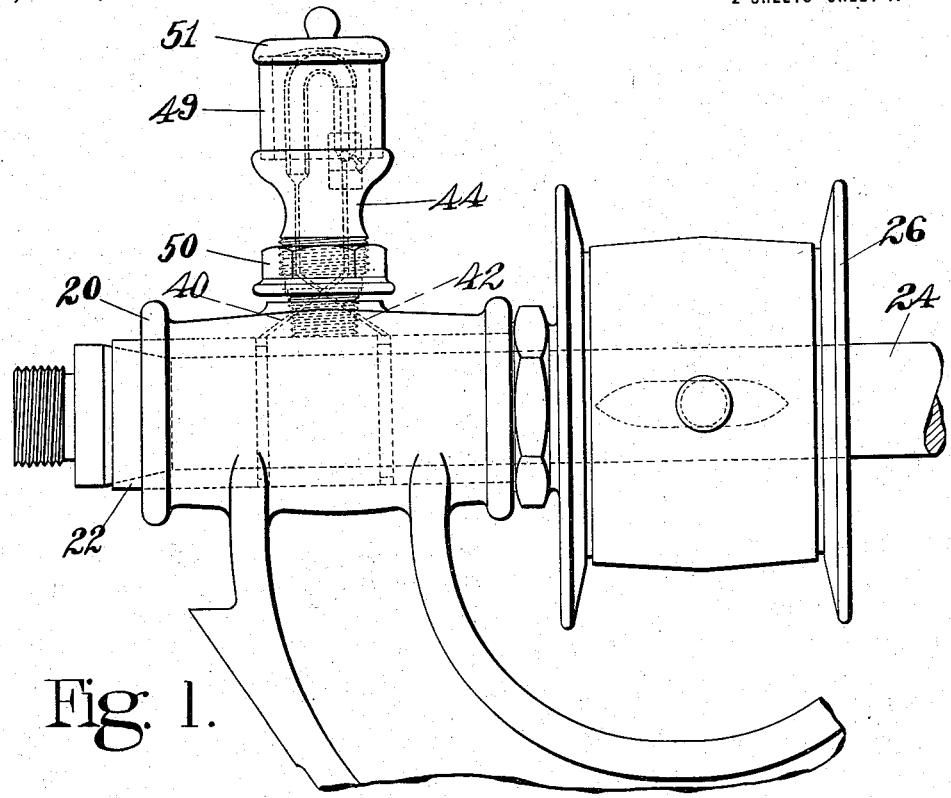

A. M. ALEXANDER.
LUBRICATING APPARATUS.
APPLICATION FILED MAR. 13, 1912.

1,157,360.

Patented Oct. 19, 1915.
2 SHEETS—SHEET 1.

WITNESSES
Elizabeth C. Coupe
Edith C. Hollrook

INVENTOR
Alexander M. Alexander
By his Attorney,
Nelson N. Howard

UNITED STATES PATENT OFFICE.

ALEXANDER M. ALEXANDER, OF BEVERLY, MASSACHUSETTS, ASSIGNOR TO UNITED SHOE MACHINERY COMPANY, OF PATERSON, NEW JERSEY, A CORPORATION OF NEW JERSEY.

LUBRICATING APPARATUS.

1,157,360.  Specification of Letters Patent.  Patented Oct. 19, 1915.

Application filed March 13, 1912. Serial No. 683,412.

*To all whom it may concern:*

Be it known that I, ALEXANDER M. ALEXANDER, a citizen of the United States, residing at Beverly, in the county of Essex and State of Massachusetts, have invented certain Improvements in Lubricating Apparatus, of which the following description, in connection with the accompanying drawings, is a specification, like reference characters on the drawings indicating like parts in the several figures.

This invention relates to lubricating apparatus.

The invention has among its objects to provide an apparatus of this character which will handle the lubricating material economically; which will be reliable in operation and which will be automatic in action.

With these objects in view, and particularly to the end that the apparatus may operate automatically, it is proposed to utilize the fluid pressure conditions existing between the friction surfaces to be lubricated to supply lubricating material to these surfaces. I have found that the relative movement of friction surfaces upon each other produces between them fluid pressures differing considerably in intensity at different points. When, for instance, a journal rotates in its bearing there is produced around the journal for a considerable angular distance a positive pressure, while around another part of the journal there is produced a region of negative pressure. The present invention provides an apparatus in which these pressure conditions are utilized to effect the delivery of oil to the friction surfaces. Furthermore, it provides an apparatus in which the pressures generated at different points between the surfaces are enabled to coöperate in effecting the delivery of oil.

A further feature of this invention consists in an arrangement in which a current of air or other gas is utilized to deliver oil to the parts to be lubricated. The required flow of air or gas may be created in various ways but, in the preferred construction, the fluid pressure conditions existing between the friction surfaces as above described are utilized for this purpose. Provision also is made for controlling the flow of gas and thereby enabling the operator to regulate the rate of delivery of oil to the parts to be lubricated.

The invention will be clearly understood from the following description of one embodiment thereof, reference being made to the accompanying drawings, in which—

Figure 2:
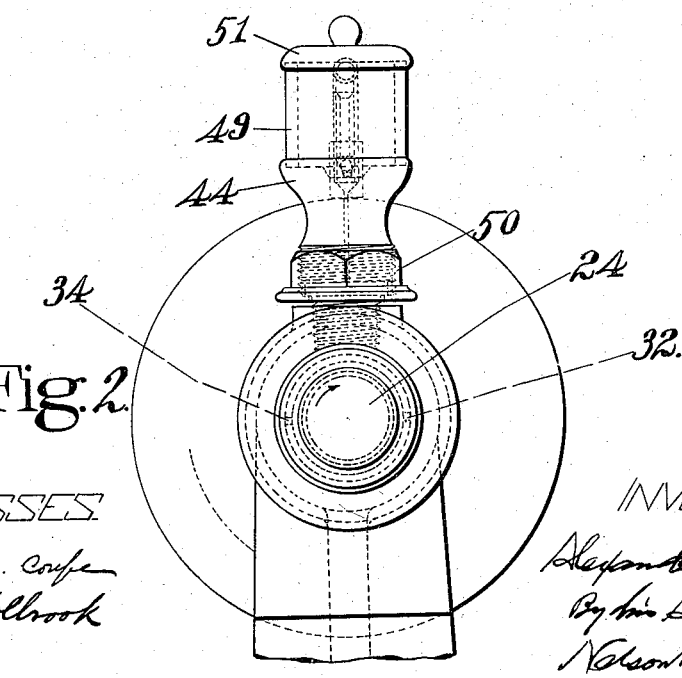
Figure 3:
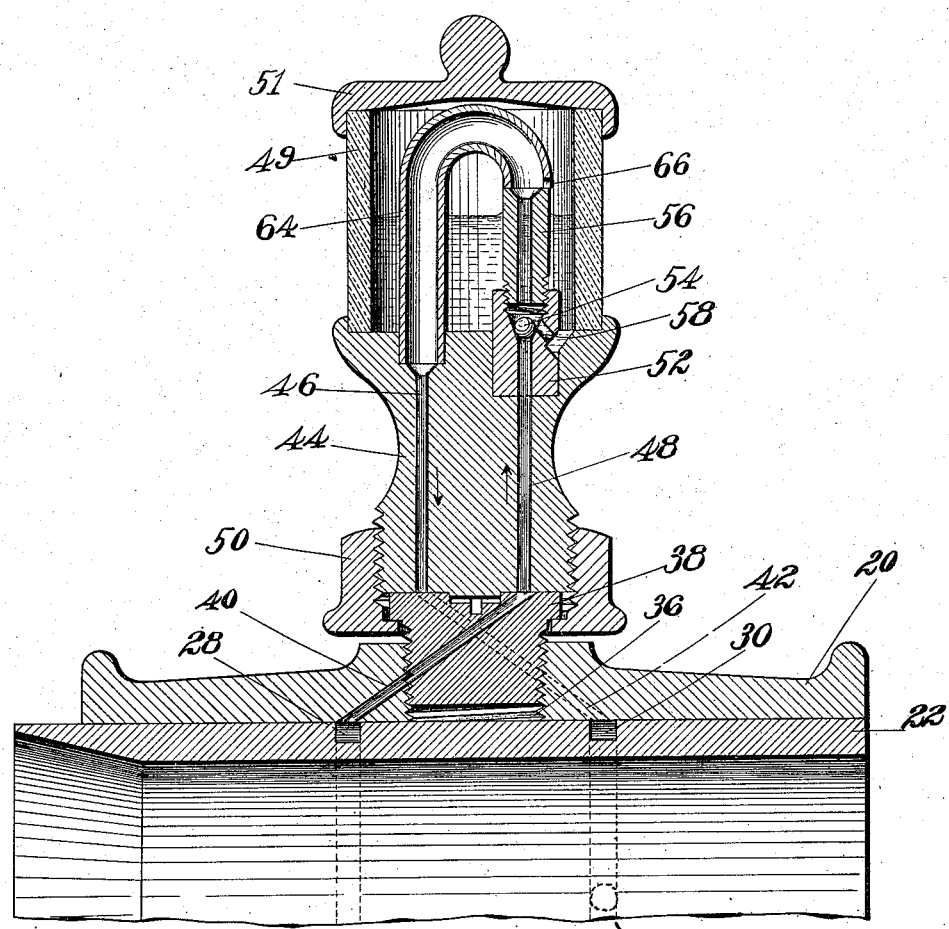

Figure 1 is a view in side elevation of an apparatus constructed in accordance with this invention; Fig. 2 is an end elevation of the apparatus shown in Fig. 1; and Fig. 3 is a longitudinal sectional view of the apparatus showing the arrangement of the oil ducts.

The apparatus shown comprises a bearing 20 having the usual bushing 22 in which a shaft 24 is rotatably supported and may be driven by a belt running over a pulley 26. The bushing 22 has two grooves 28 and 30 formed in its peripheral surface, which grooves may extend entirely around the bushing. A hole 32 is drilled through the bushing from the friction surface into the groove 28 at a point substantially in a horizontal plane passing through the axis of the shaft and another hole 34 is drilled through the opposite side of the bushing connecting the groove 30 with the friction surface. The top of the bearing 20 is drilled and tapped as indicated at 36 to receive a threaded plug 38 having a flanged head and a machined upper face. Ducts 40 and 42 are drilled diagonally through the plug 38 and the bearing 20 and open respectively into the grooves 28 and 30. These ducts, however, do not communicate with each other.

Seated upon the machined face of the plug 38 is a stem 44 of an oil cup or container; and this stem is drilled, as indicated at 46 and 48, to form two ducts designed to communicate respectively with the ducts 42 and 40. The stem is secured to the plug 38 by a nut 50 having threads to engage the threads of the stem and a flanged portion to engage the flange of the plug 38 as shown in Fig. 3. A cylindrical member 49, fitting snugly into a seat formed at the upper end of the stem 44, constitutes the oil cup. This cup may be closed by a cover 51 fitted loosely thereon, and permitting air to enter the cup. The upper end of the stem 44 is recessed to receive a valve plug 52 having a duct extending therethrough to register with the duct 48, the upper portion of this duct being enlarged to provide a seat for a small ball 54, which forms a check valve. The plug 52 is internally threaded to receive the threaded end of a short tube 56 and a duct 58, drilled downwardly from a point above the valve seat, provides communication between the interior of the cup and the bore of the tube 56. The stem 44 also supports a tube 64 which forms a continuation of the duct 46 and at its upper end is curved in substantially the form of an inverted U to communicate with the tube or duct 56. An opening 66 is provided in the tube 64 above the level of the oil to afford access to the atmosphere at this point. If desired, both the tube 64 and the member 49 may be made of glass so that the action of the apparatus may be seen.

Assuming the shaft 24 to be rotated in a clockwise direction, as indicated by the arrow in Fig. 2, a negative pressure will be created at the point where the duct 34 opens into the bearing surface and a positive pressure will be generated at the opposite side of the shaft where the duct 32 opens into the bearing. Consequently air will be forced through the aperture 32, the groove 28 and the ducts 40 and 48 lifting the check valve 54 from its seat and passing up through the oil in the duct 56 in the form of bubbles. These bubbles are carried above the surface of the oil into the duct 64. Usually each bubble breaks soon after passing the opening 66 and the oil forming the film of the bubble is urged along the ducts 64, 46, 42, 30 and 34, by the current of air flowing therethrough, and is carried into the bearing. The ball valve 54 prevents oil from flowing down the duct 48. While this apparatus in operation appears to carry oil over into the intake ducts very rapidly, the actual transfer of oil is very slow, since the quantity of oil entrained by each bubble is exceedingly small. It is important, in an apparatus arranged as above described, to have the oil ducts 32 and 34 open onto the friction surface of the bearing at points where respectively positive and negative pressures are created. The distribution of fluid pressure around the journal depends chiefly upon the position of the journal in the bearing, which, in turn, depends upon the direction of rotation of the journal, the direction and intensity of the load which it carries, and the direction and intensity of the force imparted to it by the driving means tending to press it laterally against the friction surface. Referring to Fig. 2, and assuming the shaft 24 to be driven by a belt, the direction of load and direction of belt pull coinciding and both acting vertically downward upon the shaft, it will be evident that, when the shaft is stationary, the point of maximum positive pressure will be directly under the axis of the shaft; but when the shaft is rotated in a clockwise direction and is supplied with lubricating material, the point of maximum pressure will be shifted slightly toward the left. The amount of this shifting will depend upon the load, belt pull, and speed. Experiments have demonstrated that, at a point less than 90° ahead (in the direction of rotation) of this point of maximum pressure on the "leaving" side of the journal, that is, the side at which the journal passes out of contact with the friction surface, as distinguished from the side at which it runs into contact with the bearing, the pressure changes from positive to negative; and that from this point a region of negative pressure extends for approximately 180° around the journal. Bearing this fact in mind, and remembering the influence that the belt pull, load and direction of rotation have upon the position of the journal in the bearing, the point at which the ducts 32 and 34 should enter the bearing can usually be determined without difficulty. If, however, a particular case presents difficulty because of opposing factors which, perhaps, may vary in intensity at different times as, for instance, where the belt pull is strong and acts at an angle to a variable load, the point at which the ducts should be brought into the friction surface can be determined by drilling a few test holes and either observing the action when oil is poured into these holes, or by testing the pressure at the holes with any pressure indicating device.

While the arrangement of ducts shown in Figs. 1, 2 and 3 permits gravity to aid in carrying the film of oil along the ducts toward the friction surfaces, this arrangement is not necessary and the operation of the apparatus would be equally satisfactory if it were so constructed that the current of air would have to urge the film of oil along the oil passage toward the friction surfaces against the influence of gravity.

The quantity of oil delivered to the bearing may be regulated by varying the velocity of the current of air traveling through the ducts 46 and 48 as, for instance, by adjusting the stem 44 upon the plug 38 so as to partly cut off communication between the ducts 40 and 48 and 42 and 46. In case the direction of rotation of the shaft is reversed, or the running conditions are otherwise modified so that the direction of flow of the air through the ducts 40 and 42 is reversed, it is merely necessary to turn the stem 44 on the plug 38 through an angle of 180°, thus bringing the duct 46 into communication with the duct 40 and the duct 48 into communication with the duct 42. The apparatus will then operate as above described.

It will be readily understood that the flow of air through the bearing that is produced by this apparatus is directly beneficial in cooling the bearing.

The method in accordance with which the present apparatus operates is not claimed in this application but is made the subject matter of another application Serial No. 683,411 filed concurrently herewith.

The broad claims to subject-matter common to this application and applicant's copending application Serial No. 683,413, filed concurrently herewith, are made in the latter case.

Having thus described my invention, what I claim as new and desire to secure by Letters Patent of the United States is:—

1. An apparatus of the character described, comprising a container for holding a body of oil, means for causing gas to pass through the oil in said container and means for conducting the oil entrained by the gas to the surface to be lubricated.

2. An apparatus of the character described, comprising a member having a friction surface, a duct leading to said surface, a container for holding a body of oil and means for causing gas to pass through the oil in said container and to carry oil bubbles into said duct.

3. An apparatus of the character described, comprising a member having a friction surface, an oil reservoir, an oil duct leading from said friction surface and opening into said reservoir at a point above the level of the oil in the reservoir and means for causing gas to pass through the oil in the reservoir into said duct.

4. An apparatus of the character described, comprising a member having a friction surface, an oil reservoir, an oil duct leading from said friction surface to a point above the level of the oil in the reservoir, means for creating suction at the point at which the duct opens into the friction surface, and connections for conducting air through the oil in the reservoir to said duct.

5. An apparatus of the character described, comprising a member having a friction surface, a duct leading to said surface, means for causing a current of gas to flow along said duct toward said surface, an oil reservoir, and means for forcing gas through the oil in said reservoir and causing it to carry oil bubbles into said duct.

6. An apparatus of the character described, comprising a member having a friction surface, an oil reservoir, an oil duct arranged to conduct oil from said reservoir to said surface, means for causing a current of gas to flow through at least a portion of said duct, and means for utilizing fluid pressure to lift oil from said reservoir into said duct.

7. An apparatus of the character described, comprising a member having a friction surface, a duct leading from a point on said surface to another point on said surface angularly distant from the first point, and an oil reservoir, said duct having communication with the oil in said reservoir and with the atmosphere.

8. An apparatus of the character described, comprising a bearing for a rotary shaft, a duct leading from a point upon the surface of said bearing at which positive pressure is created by the movement of said shaft to a point at which negative pressure is created by said movement, and an oil reservoir, said duct having communication with the atmosphere and communicating with the oil in said reservoir at a point between the positive pressure side of the bearing surface and the point at which the duct communicates with the atmosphere.

9. An apparatus of the character described, comprising a member having a friction surface, an oil reservoir, an oil duct leading from said friction surface and opening into said reservoir at a point above the level of the oil therein, means for causing gas to pass through the oil in said reservoir into said duct and means by which the flow of gas can be regulated.

10. An apparatus of the character described, comprising a member having a friction surface, a device moving over the friction surface of said member and coöperating therewith to create fluid pressures differing in intensity at different points on said surface, an oil reservoir, and connections between said reservoir and said points to cause said fluid pressures to coöperate in forcing oil from the reservoir to the friction surface.

11. An apparatus of the character described, comprising a bearing, an oil reservoir, a duct leading from a point on the friction surface of said bearing and having communication with the oil in said reservoir, a duct leading from said friction surface on the side opposite to said point and opening into said reservoir above the level of the oil in the reservoir, and means for conducting air through the oil from one duct to the other.

12. An apparatus of the character described, comprising a bearing, an oil reservoir, a duct leading from a point on the friction surface of said bearing and having communication with the oil in said reservoir, a duct leading from said friction surface on the side opposite to said point and opening into said reservoir above the level of the oil in the reservoir, means for conducting air through the oil from one duct to the other, and means for interchanging the connections between said ducts and the points on the friction surface at which the ducts open.

13. An apparatus of the character described, comprising a bearing, an oil reservoir, an oil duct leading from one side of said bearing to a point substantially at the bottom of the reservoir, means for preventing oil from flowing through said duct, a second duct opening into said bearing at the side opposite the entrance of the first duct and opening into the reservoir at a point above the level of the oil therein, and a duct positioned in the reservoir to conduct gas from one duct to the other.

14. An apparatus of the character described, comprising a bearing, an oil reservoir, an oil duct leading from one side of said bearing to a point substantially at the bottom of the reservoir, means for preventing oil from flowing through said duct, a second duct opening into said bearing at the side opposite the entrance of the first duct and opening into the reservoir at a point above the level of the oil therein, a duct positioned in the reservoir to conduct gas from one of said ducts to the other, and a member through which said ducts pass adjustable to partially close said ducts or to reverse the relations between the points where the ducts open into said bearing and the points where they enter the reservoir.

15. An apparatus of the character described, comprising a bearing having a friction surface, a bushing therein, said bushing having two grooves extending around it and opening respectively into opposite sides of the friction surface of the bearing, a stem supported above said bearing, an oil cup supported on said stem, said stem having ducts communicating respectively with said grooves and being mounted for movement to interchange the relation between its ducts and the grooves, a check valve for preventing the flow of oil into one of said ducts, a curved tube communicating at one end with one duct of the stem and having its other end positioned above the second duct, and a tube positioned in said cup for conducting air from one duct to the other, one of said ducts being open to the atmosphere at a point above the level of the oil in the cup and the other having communication with the interior of the oil cup near the bottom of the cup.

16. An apparatus of the character described comprising a bearing, two ducts leading from points on the friction surface of said bearing separated by a considerable angular distance, an oil reservoir, two ducts leading from said reservoir and arranged to communicate respectively with the ducts leading from said bearing, and means whereby the relation between the two sets of ducts may be interchanged.

In testimony whereof I have signed my name to this specification in the presence of two subscribing witnesses.

ALEXANDER M. ALEXANDER.

Witnesses:
JOHN H. McCREODY,
ELMER B. GRUSH.

Copies of this patent may be obtained for five cents each, by addressing the "Commissioner of Patents, Washington, D. C."